(12) United States Patent
Brown et al.

(10) Patent No.: US 8,377,635 B2
(45) Date of Patent: Feb. 19, 2013

(54) MICROFLUIDIC DEVICE

(75) Inventors: Andrew Antony Brown, Cambridge (GB); Omar Azzaroni, Capital Federal (AR); Wilhelm T. S. Huck, Comberton (GB)

(73) Assignee: Alere Switzerland GmbH, Zug (CH)

( * ) Notice: Subject to any disclaimer, the term of this patent is extended or adjusted under 35 U.S.C. 154(b) by 799 days.

(21) Appl. No.: 12/278,482

(22) PCT Filed: Feb. 12, 2007

(86) PCT No.: PCT/GB2007/000484
§ 371 (c)(1),
(2), (4) Date: Jun. 22, 2009

(87) PCT Pub. No.: WO2007/091097
PCT Pub. Date: Aug. 16, 2007

(65) Prior Publication Data
US 2010/0210037 A1    Aug. 19, 2010

(30) Foreign Application Priority Data

Feb. 10, 2006 (GB) .................................. 0602743.7

(51) Int. Cl.
*C12Q 3/00* (2006.01)
*C12M 1/38* (2006.01)
*G01N 33/558* (2006.01)

(52) U.S. Cl. .......................... 435/3; 435/286.5; 436/514
(58) Field of Classification Search .................. None
See application file for complete search history.

(56) References Cited

U.S. PATENT DOCUMENTS

| | | | |
|---|---|---|---|
| 6,375,901 B1 | 4/2002 | Robotti et al. | |
| 7,104,517 B1 * | 9/2006 | Derand et al. | 251/11 |
| 2004/0235154 A1 | 11/2004 | Oh et al. | |
| 2006/0018797 A1 * | 1/2006 | Burnell et al. | 422/100 |

FOREIGN PATENT DOCUMENTS

| | | |
|---|---|---|
| DE | 199 29 734 | 12/1999 |
| DE | 101 57 317 | 6/2003 |
| EP | 1 347 353 | 9/2003 |

OTHER PUBLICATIONS

Ravi et al. Synthesis and self-assembly of [60]fullerene containing sulfobetaine polymer in aqueous solution. J. Phy. Chem. B. 2005, vol. 109, pp. 22791-22798.*
International Search Report dated May 21, 2007 from PCT/GB2007/000484.

* cited by examiner

*Primary Examiner* — Shafiqul Haq
(74) *Attorney, Agent, or Firm* — Foley Hoag LLP

(57) ABSTRACT

A method of controlling the flow of an aqueous fluid in a microfluidic device, which makes use of a fluid gate comprising a UCST (upper critical solubility temperature) polymer and which allows fluid to flow by raising the temperature of the fluid gate above the USCT. Also provided is a device incorporating such a fluid gate and the use of such a device to detect an analyte in an aqueous fluid sample.

9 Claims, 4 Drawing Sheets

MICROFLUIDIC DEVICE

RELATED APPLICATIONS

This application is a National Stage application of PCT/GB2007/000484, filed Feb. 12, 2007, which claims priority under 35 U.S.C. 119 to application no. GB 0602743.7 filed 10 Feb. 2006. These applications are incorporated herein by reference in their entireties.

FIELD OF THE INVENTION

The present invention relates to microfluidic devices, which can be used, for example, to determine the presence or amount of an analyte in a fluid sample.

BACKGROUND TO THE INVENTION

Microfluidics is the science behind the manipulation of continuous or discrete volumes of liquid on the microlitre scale. Devices using microfluidics offer high-throughput, low cost versions of traditional analytical techniques and have found use in a variety of fields including combinatorial chemistry and drug screening. They have particularly found use in the field of biochemical assays where low analyte concentrations become a concern.

Microfluidic devices generally comprise an inlet region and a detection zone wherein the inlet region and the detection zone are connected by one or more channels and wherein the detection zone is downstream from the inlet region. A fluid sample to be analysed is placed in the inlet region and then progresses through the device to the detection zone where the presence of an analyte of interest can be assessed. In order to provide an accurate working of the device, it is important to control the flow of the fluid sample from the inlet region to the detection zone. For example, it is often necessary to retain the sample in a particular region to allow an adequate incubation time.

Previous methods for controlling the flow of a fluid in a microfluidic device have included the use of fluid gates which are responsive to changes in pH. However, such methods may not be widely applicable since the pH of the fluid sample may have to change in order for the fluid gate to be opened. It would be beneficial if there existed a mechanism by which the flow of the fluid could be controlled wherein such mechanism did not depend upon effecting changes to the chemical characteristics of the fluid.

SUMMARY OF THE INVENTION

The present invention relates to microfluidic devices, which can be used, for example, to determine the presence or amount of an analyte in a fluid sample. The present inventors have developed a new microfluidic device which provides control or modulation of the flow of the fluid within the device. Such a microfluidic device can provide accurate control of the flow of the fluid within the device. This new device includes a fluid gate that is responsive to heat such that the fluid gate can be opened by an increase in temperature.

Since the temperature of the fluid gate can be controlled with great precision, the present invention provides a mechanism for accurately controlling the flow of a fluid within the microfluidic device. Furthermore, since control over the fluid gate can be exerted externally and such control is not dependent upon the chemical characteristics of the fluid of interest, the present invention is therefore of wide applicability.

Accordingly, in one aspect the invention relates to a method of controlling the flow of an aqueous fluid in a microfluidic device, which method comprises the steps of:
(a) addition of a fluid sample to a said device which has a channel that contains a fluid gate comprising a UCST (upper critical solubility temperature) polymer,
(b) allowing the sample to be retained within the device for a period of time by the fluid gate by maintaining the temperature of the fluid gate below the USCT of the polymer such that the fluid gate is closed, followed by
(c) applying heat to raise the temperature of the fluid gate above the USCT of the polymer such that the fluid gate opens and the fluid sample is able to flow across the fluid gate to a region downstream from said gate.

In some embodiments, the invention further relates to a method of detecting an analyte in an aqueous fluid sample which method comprises:
(a) providing a microfluidic device which comprises an inlet region, an incubation zone and a detection zone, arranged such that a sample can flow from the inlet region to the incubation zone and then to the detection zone;
(b) addition of the sample to the microfluidic device through a said inlet region,
(c) allowing the sample to interact with a reagent in a said incubation zone for a period of time wherein the sample and the reagent are retained in the incubation region by means of a fluid gate which comprises a UCST polymer, followed by
(d) applying heat to open the fluid gate to allow the incubated sample to flow from the incubation zone to a detection zone.

In such an embodiment, the reagent can be a binding reagent.

In one embodiment, the invention relates to a method, comprising:
(a) flowing a liquid sample along a channel of a microfluidic device,
(b) reducing a flow of the liquid sample by contacting the sample with a fluid gate comprising a UCST (upper critical solubility temperature) polymer disposed on an interior surface of the channel,
(c) decreasing a hydrophobicity of the UCST polymer by raising a temperature of the polymer such that the fluid gate opens and the liquid sample flows across the fluid gate to a region downstream from the gate.

In such an embodiment, reducing a flow can comprise stopping a flow of the liquid.

In one aspect, the invention additionally relates to a microfluidic device which comprises a channel that has a diameter from 1 to 500 µm and a fluid gate, which has a height of from 50 to 200 nm and which comprises a USCT polymer, present within said channel.

In one aspect, the invention further relates to a microfluidic device which incorporates a fluid gate comprising a USCT polymer wherein, in the presence of a fluid sample, below the UCST the polymer is hydrophobic such that the fluid gate is closed and above the UCST the polymer is hydrophilic such that the fluid gate is open.

In one aspect, the invention also relates to a microfluidic device which comprises:
  at least one channel;
  a fluid gate which is capable of controlling the flow of an aqueous fluid in said channel and which comprises a UCST polymer that is deposited onto a surface of the said channel; and
  heating means which control the temperature and thus the hydrophobic properties of the fluid gate. In one embodiment of this device, in use, the fluid gate is open when the temperature of the gate rises above the UCST and the fluid gate is closed when the temperature of the gate is below the UCST.

In some embodiments, the invention relates to a device, comprising:
 a substrate defining a microfluidic network comprising a channel, the channel having a longitudinal axis and a channel cross-sectional area normal to the longitudinal axis, and
 a UCST polymer disposed on an inner surface of the channel, the polymer having a maximum polymer cross-sectional area normal to the longitudinal axis of the channel, the maximum polymer cross-sectional area being less than the channel cross-sectional area.

In one aspect, the invention further relates to the use of a device of the invention for detecting an analyte in an aqueous fluid sample.

BRIEF DESCRIPTION OF THE FIGURES

FIG. 4 depicts a cross-section of a microfluidic device taken parallel to the direction of a channel and through the fluid gate in use.

DETAILED DESCRIPTION OF THE INVENTION

Figure 1:
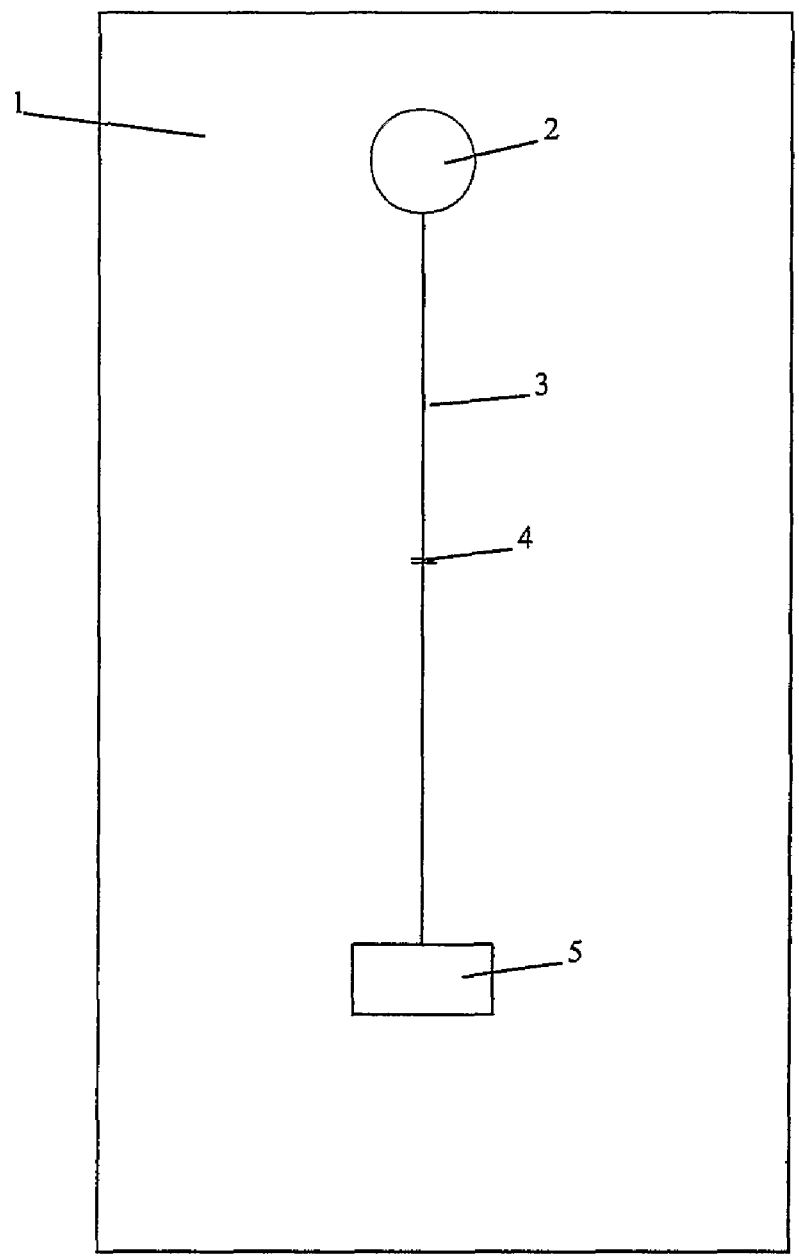
FIG. 1 depicts a schematic view of a device according to one embodiment of the invention.

In general, microfluidic devices are suitable for the detection of an analyte in a fluid sample. The devices incorporate a fluid gate which comprises a UCST (upper critical solubility temperature) polymer. The properties of a USCT polymer are temperature dependent and regulation of the temperature of the fluid gate enables the flow of fluid within the device to be controlled In order that the temperature of the fluid gate in the device can be raised above the UCST of the UCST polymer, the device can be provided with a heating means for heating the fluid gate. Such a heating means being capable of changing the hydrophobic properties of the fluid gate. Any suitable heating means could be used, for example an electrically conductive resistor, such as a resistive coil which generates heat when a current is passed there-through, or for example a ceramic plate with resistive carbon ink printed on top. The heating element may alternatively comprise a Peltier device. This has the advantage that heat may be either supplied or withdrawn from the device to respectively raise or lower the temperature. The heating means could raise the temperature of the entirety of the device, but, in an exemplary embodiment, is positioned such that heating is localised in the region of the fluid gate. In one embodiment, the heating means is positioned adjacent to the fluid gate. If the heating means requires the use of electricity, the device can also be provided with a power means to supply electricity to the heating means. In one embodiment, the heating means is integrated into the microfluidic device. In a further embodiment, the heating means and the power means are integrated into the microfluidic device.

In an alternative embodiment, a heating means may be comprised as part of a test meter to be used in combination with a microfluidic device. Where the test meter comprises the heating means, the heating means may be so arranged such that when the device is located with or inserted into the meter, the fluid gate is positioned adjacent said heating means. This allows for the transfer of heat to the fluid gate. The test-meter may be provided with a means to transfer heat from the fluid gate to the test-meter so as to lower the temperature of the fluid gate.

In general, a microfluidic device of the present invention comprises an inlet region and a detection zone wherein the detection zone is downstream of the inlet region. The inlet region and the detection zone are usually in fluid communication via one or more channels. In one embodiment, at least one of these channels comprises a fluid gate which comprises the UCST polymer. The devices of the present invention may comprise a fluid sink downstream of the inlet region wherein the fluid sink and the inlet region are fluid communication via one or more channels. A fluid gate which comprises the UCST polymer may also be present in at least one of the channels which links the fluid sink and the inlet region. In general, when the device comprises a detection zone and a fluid sink, the fluid sink is downstream of the detection zone. In one embodiment, the device of the present invention comprises an inlet region which is upstream of an incubation chamber which is upstream of a detection zone which is upstream of a fluid sink. In one embodiment, the device comprises an inlet region and a detection zone which are connected by one or more said channels and wherein the detection zone is downstream of the inlet region.

The inlet region of the device is the area where the fluid sample is introduced into the device. After introduction of the fluid sample into the device, it flows from the inlet region to the detection region or from the inlet region to the fluid sink. In this regard, the detection region or the fluid sink can be said to be positioned "downstream" from the inlet region. Alternatively, the inlet region can be said to be positioned "upstream" of the detection zone or the fluid sink. The volume of sample introduced into the device will depend upon numerous factors which include the concentration of the analyte of interest and the amount of sample available. In some embodiments, the volume of the sample is at least about 0.1 µL (e.g. at least about 0.5 µL, or at least about 1 µL). In some embodiments, the volume of the sample is about 100 µL or less (e.g. about 25 µL or less, or about 20 µL or less). However, typical sample volumes are in the region of 0.1 to 100 µL. In an exemplary embodiment, the sample volumes are 0.5 to 25 µL. In a further embodiment, the sample volumes are 1 to 20 µL. Typically the flow rates of the fluid samples are from 10 nL/minute to 20 µL/minute.

In some embodiments, the devices have a chamber configured to receive the fluid sample. In some embodiments, the volume of the chamber is at least about 0.1 µL (e.g. at least about 0.5 µL, or at least about 1 µL). In some embodiments, the volume of the chamber is about 100 µL or less (e.g. about 25 µL or less, or about 20 µL or less). However, typical chamber volumes are in the region of 0.1 to 100 µL. In an exemplary embodiment, the chamber volume is from 0.5 to 25 µL. In a further embodiment, the chamber volumes are from 1 to 20 µL.

The detection zone of the device is the area from which it is possible to determine whether the analyte was present in the fluid sample. Thus, the detection zone can comprise any means for detecting an analyte. The analyte can be detected by means of a binding reaction, for example a homogeneous immunological binding reaction, or can be detected by a means a reaction other than binding, for example an enzymic reaction such as the indirect electrochemical detection of an analyte involving an enzyme and an electron mediator. Typically, the detection zone will comprise one or more capture zones. The capture zones are generally comprised of elements, such as receptors or biosensors, which bind or react with one or more components that are present in the sample which enters the detection zone. The elements are typically immobilized on the surface of the capture zone. The binding of the components to the capture zone can be used to determine the presence or the amount of analyte that was present in the fluid sample. The detection zone may comprise a single capture zone, in which case the device would be suitable for the detection of a single analyte in the fluid mixture. Alternatively, the detection zone may comprise more than one capture zone, in which case the device would be suitable for detecting the presence of more than one analyte. In one embodiment, the analyte is labelled with a magnetic particle and the capture zone comprises a magnetic surface. The detection zone can be a chamber where fluid flows into and then stops.

The amount of binding of the component to the capture zone can be measured by any suitable method and such methods would be familiar to those skilled in the art. In one embodiment, the detection zone comprises an optical detection window which is capable of transmitting a visual signal as to whether the analyte was present in the fluid sample.

When present, the fluid sink acts as a used reagent reservoir and receives the fluid sample together with any reagents and other components that were present or were introduced into the device. Typically, the volume of the fluid sink is at least the volume of the fluid sample and the additional reagents that are introduced to or are in the device.

A fluid gate which comprises a UCST polymer may be provided either upstream or downstream of the detection zone. Typically the fluid gate is upstream of the detection zone. However, in one embodiment, the fluid gate is downstream of the detection zone. This embodiment is particularly advantageous since it enables the fluid sample to be retained in the detection zone for a given period of time and then, by raising the temperature of the fluid gate, the sample can be released from the detection zone and can, for example, flow into a fluid sink.

The devices generally comprise one or more channels through which the fluid sample flows. Typically, the fluid sample flows along a longitudinal axis of the channel. Usually, the devices comprise at least one channel having at least a capillary dimension e.g. along a dimension perpendicular to the longitudinal axis such as at least one of height, width or radius. In some embodiments, the capillary dimensions for aqueous liquids are about 0.01 mm or more (e.g. about 0.05 mm or more). In some embodiments, the capillary dimensions for aqueous liquids are about 2.0 mm or less (e.g. about 1.0 mm or less). Typical capillary dimensions for aqueous liquids are from 0.01 to 2.0 mm, for example 0.05 to 1.0 mm. Typical non-capillary dimensions are larger than 2 mm. Generally, at least a portion of the channel has at least one capillary dimension. Typically, the channels are of capillary dimension such that the fluid sample may pass along it under the influence of capillary force. In one embodiment, the fluid movement through the device is driven by capillarity. Generally, the channels have at least one internal cross-sectional dimension, for example length, depth, width or diameter, that is less than 500 µm and typically between 0.1 and 500 µm. In one embodiment, the channels have at least one internal cross-sectional dimension (e.g., at least one of a height or a width) that is between 0.1 and 500 µm, for example between 0.1 and 200 µm. In an exemplary embodiment, the channels have at least one internal cross-sectional dimension that is between 1 and 100 µm. In an exemplary embodiment, the internal cross-sectional dimension referred to above is the diameter of the channel. Typically, the fluid gate is present in a channel. The devices of the present invention can comprise multiple channels, for example 2, 3 or 4 channels. Typically, one or more of the channels are of capillary dimension. In one embodiment, all of the channels are of capillary dimension. In a device which possesses multiple channels, one or more of the channels may incorporate a fluid gate which comprises a UCST polymer.

The width of the channel may vary and may typically vary from between 0.01 mm to 30 mm. However, the wider the channel width, the larger the overall area of cross-section of the channel and therefore the larger the sample fluid volume requirement.

In one embodiment, the height of the USCT polymer is less than the less than the height of the channel.

Typically, the minimum distance between the outer surface (or the top) of the fluid gate and the opposed surface of the channel is at least about 5 µm (e.g. at least about 10 µm, or at least about 20 µm or at least about 50 µm).

In one embodiment, the fluid gate can be considered to have an open state and a closed state. In the open state, fluid is able to pass the gate and flow to a downstream portion of the device. In the closed state, the flow of the fluid to the downstream portion of the device is reduced. In one embodiment, when the fluid gate is in the closed state, the flow of the fluid is stopped.

In one embodiment, when the fluid gate is in an open state, there is an unobstructed cross-sectional dimension (e.g. height or width) measured perpendicular to the longitudinal axis that is at least about 5 µm (e.g. at least about 10 µm, or at least about 20 µm or at least about 50 µm).

In one embodiment, the fluid is liquid. In such an embodiment, a fluid sample is a liquid sample.

In one embodiment, the channel has a longitudinal axis and a channel cross-sectional area normal to the longitudinal axis. In one embodiment, the UCST polymer is disposed on an inner surface of the channel, the polymer having a maximum polymer cross-sectional area normal to the longitudinal axis of the channel, the maximum polymer cross-sectional area being less than the channel cross-sectional area. In one embodiment, the cross-sectional area of the polymer is about 50% or less (e.g. about 25% or less, or about 15% or less) of the channel cross-sectional area.

In one embodiment, the USCT polymer has a first hydrophilicity at a first temperature and a second greater hydrophilicity at a second greater temperature. In such an embodiment, the first and second temperatures are typically less than 100° C.

In one embodiment, the device can comprise a heat source in thermal communication with the UCST polymer and a controller configured to operate the heat source, wherein the controller is configured to increase a temperature of the heat source during operation to raise the temperature of the polymer to at least the second temperature.

The dimensions of the fluid gate are chosen such that in use, fluid is unable to pass the fluid gate when the UCST polymer is in hydrophobic phase and the fluid is able to pass the fluid gate when the UCST polymer is its hydrophilic phase. The polymer layer may have a width therefore equivalent in width to that of the channel. A typical length of the polymer layer would be between 0.1 and 10 mm. The overall dimensions of the polymer layer will depend upon the nature of the fluid sample, the density of the polymer layer, and the type of UCST polymer. For example surfaces having higher number of hydrophobic polymer brushes per unit area will have a higher contact area. The layer may be provided in a continuous form or it may be provided as a patterned layer of discrete amounts of polymer.

The length of the capillary flow-path typically ranges from 10 mm-500 mm.

The dimensions of the device are typically between 3 mm and 20 mm in width and between 10 mm-100 mm in length.

The microfluidic channel may be of a regular or irregular shape and comprise further elements such as one or more of a v-groove, a projection such as a pillar, junction, bifurcation, roughened surface and filter. The polymer layer may be provided on a surface of a further element such as being provided on a surface of one or more pillars.

In one embodiment, the device comprises a single channel which runs between the inlet region and the detection zone. This single channel may be interrupted by one or more regions in the device, for example it may be interrupted by an incubation chamber. In a further embodiment, the device of the present invention comprises a single channel which runs between the inlet region and the fluid sink wherein this channel may be interrupted by one or more regions such as an incubation chamber and a detection zone. In another embodiment, the device can comprise one or more channels which intersect. Such intersections may take any suitable form, for example cross intersections or T-junctions.

When flowing from the inlet region to the detection zone or the fluid sink, the fluid sample may pass through one or more regions in the device where the sample may be reacted with a reagent. In this regard, the analyte will typically react with the regent in such a manner that the presence of the analyte can be detected when the sample reaches the detection zone. The channels of the device may be interrupted by one or more of such regions.

In one embodiment, the region in the device where the sample may be reacted with a reagent is an incubation chamber. Thus, the devices of the present invention may comprise an incubation chamber. The fluid sample is generally retained in such a chamber for a period of time whilst it undergoes reaction with a reagent. Such an incubation chamber may be used to react the analyte with a binding reagent before the sample progresses to the detection zone where the presence of the product of the reaction between the analyte and the binding reagent can be determined. In one embodiment, the binding reagent is labelled and the detection zone is suitable for determining the presence of the analyte-labelled binding reagent reaction product.

The nature of the reagent will depend upon the analyte of interest. The reagent may, for example, be chosen from a chemical or biochemical reactant such as an alkali, an acid, a lysing agent, a buffer, a precipitating agent such as a coagulating agent, or an enzyme. Given a particular analyte, the skilled person would be well aware of suitable binding reagents. However, in one embodiment, the binding reagent is an antibody. In this regard, in an exemplary embodiment the antibody is labelled with an enzyme or that the antibody is adsorbed onto a colloidal particle such as a gold colloid.

The reagent can be provided in any suitable form for reaction with the fluid sample. In one embodiment, the reagent is in the dry state prior to the device being used. In this regard, once the sample enters the region the reagent is reconstituted.

As used herein, the term "analyte" refers to any molecule, compound or particle to be detected. Any analyte which is capable of being detected in the detection zone or any analyte which can be modified such that it can be detected using the device of the present invention. Suitable analytes include organic and inorganic molecules, including biomolecules. In an exemplary embodiment, the analyte may be an environmental pollutant (including pesticides, insecticides, toxins, etc.); a chemical (including solvents, polymers, organic materials, etc.); therapeutic molecules (including therapeutic and abused drugs, antibiotics, etc.); biomolecules (including hormones, cytokines, proteins, peptides, DNA and fragments thereof, nucleotides, lipids, carbohydrates, cellular membrane antigens and receptors (neural, hormonal, nutrient, and cell surface receptors) or their ligands, etc); whole cells (including procaryotic (such as pathogenic bacteria) and eukaryotic cells); or spores. In an exemplary embodiment, the analyte is a cardiac marker such as brain natriuretic peptide (BNP), N-terminal related BNP, atrial natriuretic peptide, urotensin, urotensin related peptide, myoglobin, CK-MB, troponin I or troponin T.

Suitable fluid samples include bodily fluids including blood, serum, plasma, interstitial fluid, lymph, saliva, vaginal and anal secretions, urine, feces, perspiration and tears, and fluids derived from solid tissues, including liver, spleen, bone marrow, lung, muscle and brain. In an exemplary embodiment, the fluid samples are selected from urine, blood, serum and saliva. The fluid samples may be derived from bodily fluids and solid tissues. In this regard, the bodily fluids and solid tissues may undergo one or more treatment step before they are in a form suitable to be introduced into the microfluidic device of the present invention. Typically, the fluids samples are hydrophilic in nature. In an exemplary embodiment, the fluid samples are aqueous fluid samples.

In order to control the flow of the fluid through the device, the devices can comprise a fluid gate which is positioned in at least one of the channels. The fluid gate can be opened and closed in order to control the flow of fluid through the device. The fluid gate can be positioned within a channel in any part of the device which allows the fluid gate to affect the flow of the fluid within the device. In general, fluid flow through the device is propelled by the interfacial tension force where the fluid contacts at least one face of the channel. The gate then operates by modifying the interfacial tension on at least one of the faces of the channel. In one embodiment, when the device comprises an incubation chamber, the fluid gate is positioned at the outlet of said chamber. The fluid gate can thus be used to retain the fluid in the chamber for a requited period of time whilst it undergoes reaction with a reagent. In another embodiment, when the device comprises an incubation chamber, the fluid gate can be positioned upstream of the chamber and can thus allow fluid to enter the chamber after a given period of time. In a further embodiment, when the device comprises an incubation chamber, there may be fluid gates positioned both upstream and downstream of said chamber in order to control the flow of fluid into and out of the chamber. In an additional embodiment, when the device comprises an incubation chamber, a detection zone and a fluid sink, there may be fluid gates positioned both upstream and downstream the incubation chambers and the detection zone in order to control the flow of fluid into and out of these regions.

UCST polymers display thermally responsive behavior and change from being hydrophobic in nature to being hydrophilic in a relatively narrow temperature range. The temperature at which the behavior of the polymer changes is known as the upper critical solubility temperature (UCST).

In a device where the flow is driven by capillarity, if a UCST polymer is deposited on at least one of the device walls in a particular region of the device, which we term the gate region, then when the fluid reaches the gate region the force propelling the fluid through the gate region will depend on whether the UCST polymer is in its hydrophobic (low temperature) or hydrophilic (high temperature) state. If the UCST polymer is deposited on a hydrophilic face of the device, then when the UCST polymer is in its hydrophobic state the capillary force available to propel the fluid through the gate region will be diminished.

The device can easily be designed so that the total capillary force available to move the fluid is then insufficient, so that the fluid front will advance to the edge of the gate region and then stop. If the temperature is raised to switch the UCST polymer into its hydrophilic state, then the capillary force available to propel the fluid through the gate region will be increased, and the device can be designed so that this force is sufficient to propel the fluid front through the gate region. Thus, the fluid will advance to the gate region, and stop there until the temperature is raised, then move on. After the fluid front has passed the gate region, the temperature can be reduced once more, since this region is then covered by fluid and is not any more providing capillary driving force.

It will be evident to those skilled in the art that the flow velocity in a capillary driven device is determined by the balance between the interfacial tension force integrated around the contact line of the fluid with the device walls and the air, and the viscous drag of the fluid. The force due to gravity (arising either from the orientation of the device or from any fluid droplet present on the device inlet) has to be added to the interfacial tension force. The viscous drag of the fluid is determined by the viscosity of the fluid, the device dimensions and by the total length of the fluid column. If the interfacial tension force is not large enough, the fluid front becomes pinned. Pinning is dependent on defects in the device walls, particularly the roughness. The interfacial tensions on the walls of the device can all be altered to ensure that the fluid is normally moving but becomes pinned when it reaches the gate region, when the UCST polymer is in the hydrophobic state.

In an exemplary embodiment, the difference in interfacial tension between the hydrophobic and hydrophilic states of the USCT polymer is large enough that, when the switch to the hydrophilic state takes place, the fluid front unpins, and starts to move again. In general, the UCST polymers have, between the two states, a large difference in interfacial tension with water. They are also unusual in providing a switch from hydrophobic to hydrophilic with increase of temperature. They are therefore particularly suited to controlling capillary flow in devices carrying aqueous solutions, specifically samples of biological origin. Compounds previously known in the art, such as poly(N-isopropylacrylamide) (T Sun et al, Angewandte Chemie, International Edition, 43, 2004, 357-360) switch from hydrophilic to hydrophobic with increase of temperature, and therefore cannot be used in devices for aqueous media in the simple way that we describe.

The UCST polymer can be deposited on the desired location of the device by masking and patterning the required part of the device then growing the polymer directly onto the device wall, using for example atom-transfer radical polymerization (ATRP). Alternatively, the polymer can be grown (eg by ATRP) onto the surface of a suitable particulate material, such as silica, and then the modified particulate material can be deposited onto the device surface in the required place by one of a number of industrial patterning processes—for example, screen printing, ink-jet printing, bubble jet printing or micro-pipetting. If the UCST material is formed on the surface of a particulate material which is then deposited on at least one of the faces of the channel, then the effect of the switch in interfacial tension is amplified by the effect of the roughness of the deposit (T Sun et al, loc cit).

In an exemplary embodiment, the fluid gate is typically closed below the UCST of the UCST polymer and is open when the temperature of the fluid gate rises above the UCST. Thus, when the fluid gate is below the UCST of the polymer, any fluid reaching the fluid gate is unable to pass since the gate is closed. When the temperature of the fluid gate rises above the UCST, then the gate opens and the fluid is allowed to pass. In general, when the temperature of the fluid gate returns to being the below the UCST, the gate will then prevent the passage across it of another fluid interface. Thus if, for example, the fluid is separated into sections by interposed bubbles of air, after one section of fluid has passed the gate, the gate can be closed again to stop the passage of the fluid at the next fluid/air interface. The gate can therefore reversibly be opened and closed by raising and then lowering the temperature. Manipulation of the temperature of the fluid gate thus allows the flow of the fluid within the device to be controlled. This is particularly useful when it is desired to retain the fluid in a particular region of the device, such as an incubation chamber, for a given time.

In one embodiment, when the fluid sample is aqueous in nature, the fluid gate presents a hydrophobic surface when the temperature of the fluid gate is below the UCST of the UCST polymer. The aqueous fluid sample is incompatible with the hydrophobic surface of the fluid gate and is therefore unable to pass i.e. the fluid gate is closed. When the temperature of the fluid gate is above the UCST the fluid gate is changed such that it presents a hydrophilic surface. The aqueous fluid sample is compatible with the hydrophilic surface of the fluid gate and is therefore able to pass i.e. the fluid gate is open.

In some embodiments, the working temperature of the device, $X°$ C., is at least about $10°$ C. (e.g. at least about $15°$ C.). In some embodiments, the working temperature of the device, $X°$ C., is about $40°$ C. or less (e.g. about $30°$ C. or less). In general, the working temperature of the device, $X°$ C., is usually from 10 to $40°$ C., for example from 15 to $30°$ C. In an exemplary embodiment, the working temperature of the device is room temperature. At this temperature, the fluid gate is generally closed. When the temperature of the device rises to a temperature, $Y°$ C., wherein temperature $Y°$ C. is greater than $X°$ C., the fluid gate opens. In some embodiments, the temperature $Y°$ C. is at least about $30°$ C. (e.g. at least about $35°$ C., or at least about $40°$ C.). In some embodiments, the temperature $Y°$ C. is about $70°$ C. or less (e.g. about $60°$ C. or less, or about $50°$ C. or less). In one embodiment, the temperature, $Y°$ C. is from 30 to $70°$ C., for example from 35 to $60°$ C. In an exemplary embodiment, the temperature $Y°$ C. is from 40 to $50°$ C.

In this regard, any material which is able to change from being hydrophobic at temperature $X°$ C. to being hydrophilic at temperature $Y°$ C. can therefore be used to produce the fluid gate.

The fluid gate may be opened and closed a number of times by respectively raising and lowering the temperature of the fluid gate to enable the UCST polymer to undergo a phase transition.

In one embodiment the fluid gate has a height, measured in air, which is greater than 50 nm.

In some embodiments, the height of the fluid gate is at least about 50 nm (e.g. at least about 70 nm). In some embodiments, the height of the fluid gate is about 200 nm or less (e.g. about 180 nm or less). In one embodiment, the height of the fluid gate is from 50 to 200 nm. In a further embodiment, the height of the fluid gate is from 70 to 180 nm.

In one embodiment, the USCT polymer comprises a number of zwitterionic groups. Without being limited by theory, it is thought that, since the zwitterionic groups can have a high dipole moment, electrostatic interactions between the opposite charges present in the polymer chains leading to interchain and/or intrachain ionic crosslinking. However, when the polymer is in the presence of a suitable solvent, such as water, solvation counteracts the electrostatic interactions and can forces the anionic and cationic moieties further apart. Since, electrostatic interactions can be dominated by the dielectric characteristics of the solvent, water for example has a high dielectric constant ($\in$) of ~80, the electrostatic attraction between the opposite charges can be reduced further. In addition, the hydration layer around the charges increases excluded volume effects which can lead to swelling of the polymer. Thus, ion-pairing and self-association would require water to be removed from the charges and will only occur when the electrostatic energy is larger than the energy required for dehydration. Self-association of the polymer will result in it having an external surface that is hydrophobic in nature whilst non-association of the polymer will result in it having an external surface which is hydrophilic in nature. Since the self-association and non-association of the polymer can be affected by variations in temperature, the behavior of the polymer can be readily controlled.

In some embodiments, the UCST of the UCST polymer is at least about 30° C. (e.g. at least about 35° C. or at least about 40° C. In some embodiments, the UCST of the UCST polymer is about 70° C. or less (e.g. about 60° C. or less, or about 50° C. or less). The UCST of the UCST polymer is usually between 30 and 70° C., for example between 35 and 60° C. In an exemplary embodiment, the UCST of the UCST polymer is between 40 and 50° C.

Any polymer which has a UCST would be suitable for use in the present invention. Such polymers can include zwitterionic polymers, polyelectrolytes and polymers derived from polystyrenes, polyvinyl alcohols, polyvinyl pyrazoles, polyethylene oxides, polyacrylic acids and derivatives thereof. In an exemplary embodiment, the USCT polymers are zwitterionic polymers. In a further exemplary embodiment, the UCST polymers are sulfobetaine polymers. In an additional embodiment, the UCST polymers are produced by the polymerization of a [2-(methacryloyloxy)ethyl]-dimethyl-(3-sulfopropyl) ammonium hydroxide (MEDSAH) monomer. The polymer can be formed from one or more monomers using any suitable polymerization method. In one embodiment, the polymer is formed by atom transfer radical polymerization (ARTP). As used herein, the term "polymer" is intended to refer to both homopolymers and copolymers.

In an exemplary embodiment, the UCST polymer is in the form of a polymer brush. A polymer brush is formed when one or more polymer chains are anchored to a surface. Such anchoring can be achieved by methods such as adsorption or grafting. In an exemplary embodiment, the anchoring is achieved by grafting. Any suitable method can be used produce the UCST polymers and to anchor them to the surface. In this regard, the polymer can be firstly be synthesised and can then be grafted to the surface, or the polymer can be grown from the surface itself. One particular method of producing a grafted polymer is the surface-initiated, atom transfer radical polymerization (ATRP) of a suitable monomer. Such a process is suitable for the production of a polymer grafted to a silicon or gold surface or to the surface of an oxide. The UCST polymer layer may be provided by spin-coating a solution of the polymer onto the surface. The polymer may be attached to the surface of the channel by means such as by covalent attachment. Attaching the polymer to the surface has the advantage that when it is in its hydrophilic phase it is more likely to remain in place and not be displaced by the advancing fluid. This advantageously enables the fluid gate to be reversible, namely the temperature of the fluid gate can be lowered, resulting in the UCST polymer to revert to its hydrophobic phase.

The thickness of the polymer brush is one factor than can affect its behavior. In this regard, in one embodiment the polymer brush has a thickness, measured in air, which is greater than 50 nm.

In some embodiments, the thickness of the polymer brush is at least about 50 nm (e.g. at least about 70 nm). In some embodiments, the thickness of the polymer brush is about 200 nm or less (e.g. about 180 nm or less). In one embodiment, the thickness of the polymer brush is from 50 to 200 nm. In a further embodiment, the thickness of the polymer brush is from 70 to 180 nm.

The hydrophobicity and hydrophilicity of the UCST polymer can be measured by means of the advancing water contact angle ($\theta_{AW}$). Typically, when the UCST polymer is hydrophobic in nature the advancing water contact angle is usually greater than 65°, for example greater than 70°. On the other hand, when the UCST polymer is hydrophilic in nature the advancing water contact angle is usually less than 60°, for example less than 55°. In general, the difference in water contact angle between the UCST polymer in its hydrophobic and hydrophilic states is typically more than 15° and is usually in the region of 20 to 25°. However, if the surface is rough (for example if the UCST polymer is formed onto the surface of a powder which is then deposited onto the device surface) then the contact angle for an aqueous solution with the hydrophobic surface can approach 180°, and that with the hydrophilic surface can approach 0°.

It has also been found by the present inventors that UCST polymers can be changed from hydrophilic in nature to hydrophobic in nature in the absence of a solvent, such as in the absence of water. Thus, when the UCST polymer is acting as a fluid gate, the properties of the polymer can be changed quicker than the speed of the advancing fluid meniscus. This provides a specific advantage over pH dependent fluid gates which require the presence of a solvent to solvate the ions.

In one embodiment, we provide a microfluidic device for the detection of an analyte in a fluid sample, the device comprising an inlet region, a fluid gate which comprises a UCST (upper critical solubility temperature) polymer and a detection zone; the inlet region and the detection zone being connected by one or more channels, at least one of said channels comprising the fluid gate, and the detection zone being downstream of the inlet region.

In a further embodiment, we provide a device having an incubation zone, a detection zone and a fluid sink, wherein the sample may interact with a first binding reagent in the incubation zone and a second binding reagent in the detection zone, and where fluid gates which comprise a UCST polymer are placed between the incubation zone and the detection zone and between the detection zone and the fluid sink. In this embodiment, the time which the fluid spends in the incubation zone before being allowed to move to the detection zone and the time which the fluid spends in the detection zone before being allowed to move into the sink can both accurately be controlled.

A channel within an aforementioned device is not limited to having a single fluid gate, and one channel may possess multiple, for example two or three, fluid gates which comprise a UCST polymer. Furthermore, when the device comprises multiple channels, one or more of the channels may possess one or more fluid gates, wherein said fluid gates comprise a UCST polymer. In one embodiment, each channel within the device comprises at least one fluid gate, wherein said fluid gate comprises a UCST polymer.

The device may further comprise additional features which enable the presence of the analyte of interest to be detected more accurately. In this regard, the device can comprise further inlet regions which enable additional samples or reagents to be introduced into the device. Such inlet regions also enable electrodes to be placed in direct contact with the fluid and thus electric fields can be used to control the flow of fluid through the device. The device may comprise one or more filters which enable particulates to be removed from the fluid or which can, for example, filter blood cells from a blood sample thus enabling plasma to flow further through the device. In order to control the flow of fluid through the device, it may also contain elements such as one or more baffles, bifurcations, valves, fluid gates, constrictions, fluid pumps and reservoirs. In order to increase the accuracy of the device, there may also be built in sensing agents which can, for example, determine the extent of a reaction which occurs within the device. The skilled person would be well aware of such elements and how they could be employed.

The aforementioned devices can be produced from any suitable material which include polymeric materials, for example plastics such as polymethylmethacrylate, polycarbonate, polytetrafluoroethylene, polyvinylchloride, polydimethylsiloxane and polysulphone. The surfaces of the materials may be provided with a coating to make them more or less hydrophilic.

The microfluidic devices are typically formed from an aggregation of two or more separate layers which are appropriately mated or joined together. Typically, the microfluidic device described herein comprises a top portion, a bottom portion, and an interior portion, wherein the interior portion substantially defines the channels and various regions of the device. Typically, the devices are microfabricated by techniques such as photolithography, wet chemical etching, laser ablation, air abrasion techniques, LIGA, reactive ion etching (RIE), injection moulding and embossing. Such techniques can be used to produce the channels and regions which are present in the device. The materials used to produce the device are typically selected to be compatible with both the chosen method of manufacture and also the conditions to which the device may be exposed. Such conditions include extremes of pH, temperature, salt concentration, and also the presence of electric fields.

In one embodiment, we describe a microfluidic device incorporating a fluid gate comprising a UCST (upper critical solubility temperature) polymer.

We also describe a method of controlling fluid flow in a microfluidic device, comprising the addition of a fluid sample to a device of the present invention, allowing the sample to be retained within the device for a period of time by a fluid gate which comprises a UCST polymer; followed by applying heat to the fluid gate such that fluid sample is able to flow across the fluid gate to a region downstream from said gate.

We further describe the use of a UCST polymer as a fluid gate in a microfluidic device.

In accordance with one aspect, the fluid gate comprising a UCST polymer is initially provided in the form of its hydrophobic phase on the surface of a fluid channel. Fluid added to the microfluidic device is therefore able to flow along the channel to the fluid gate whereupon it is unable to pass the hydrophobic region. In use, heat is applied to the fluid gate causing the UCST polymer to undergo a phase transition resulting in the formation of a hydrophilic phase and resulting in the opening of the fluid gate, allowing fluid sample to pass over the gate.

The USCT polymer may be provided as a layer on the surface of the fluid channel wherein the thickness of the layer is such that fluid is able to pass over the layer when the fluid gate is open. In such an embodiment, the height of the layer is less than the height of the microfluidic channel.

The UCST polymer can be in the form of a self-associated regime when in its hydrophobic phase and in the form of its non-associated regime when in its hydrophobic phase.

We also describe a device comprising a body structure and at least a microfluidic channel disposed therein and further comprising a fluid gate comprising a hydrophobic UCST polymer layer provided on a surface of said microfluidic channel, wherein the height of the UCST polymer layer is less than the height of the microfluidic channel.

In one embodiment, we describe a method of controlling fluid flow in a microfluidic device, comprising the addition of a fluid sample to an aforementioned device, allowing the sample to be retained within the device for a period of time by a fluid gate which comprises a UCST polymer, followed by applying heat to the fluid gate such that fluid sample is able to flow across the fluid gate to a region downstream from said gate.

In one embodiment, we further provide a method of detecting an analyte in a fluid sample which method comprises addition of the sample to a microfluidic device through an inlet region, allowing the sample to interact with a binding reagent in an incubation zone for a period of time wherein the sample and the binding reagent are retained in the incubation region by means of a fluid gate which comprises a UCST polymer, followed by applying heat to open the fluid gate to allow the incubated sample to flow from the incubation zone to a detection zone. In particular, such a method is performed using a microfluidic device as defined herein.

In one embodiment, we also provide the use of a UCST polymer as a fluid gate in a microfluidic device.

The present invention will now be described by way of example by reference to the accompanying drawings.

FIG. 1 is a schematic illustration of an embodiment of the invention. The features of the device, such as the inlet region, channels and detection zone, are typically fabricated into or upon the substrate 1. The device comprises an inlet region 2 and a detection zone 5 which are connected by a channel 3. The channel 3 houses a fluid gate 4 wherein such fluid gate 4 is closed at a temperature below the UCST of the UCST polymer and open at a temperature above the UCST of the polymer. In use, the fluid sample enters the device at the inlet region 2 and then flows towards the detection zone 5 via the channel 3 in which the fluid gate 4 is situated.

Figure 2:
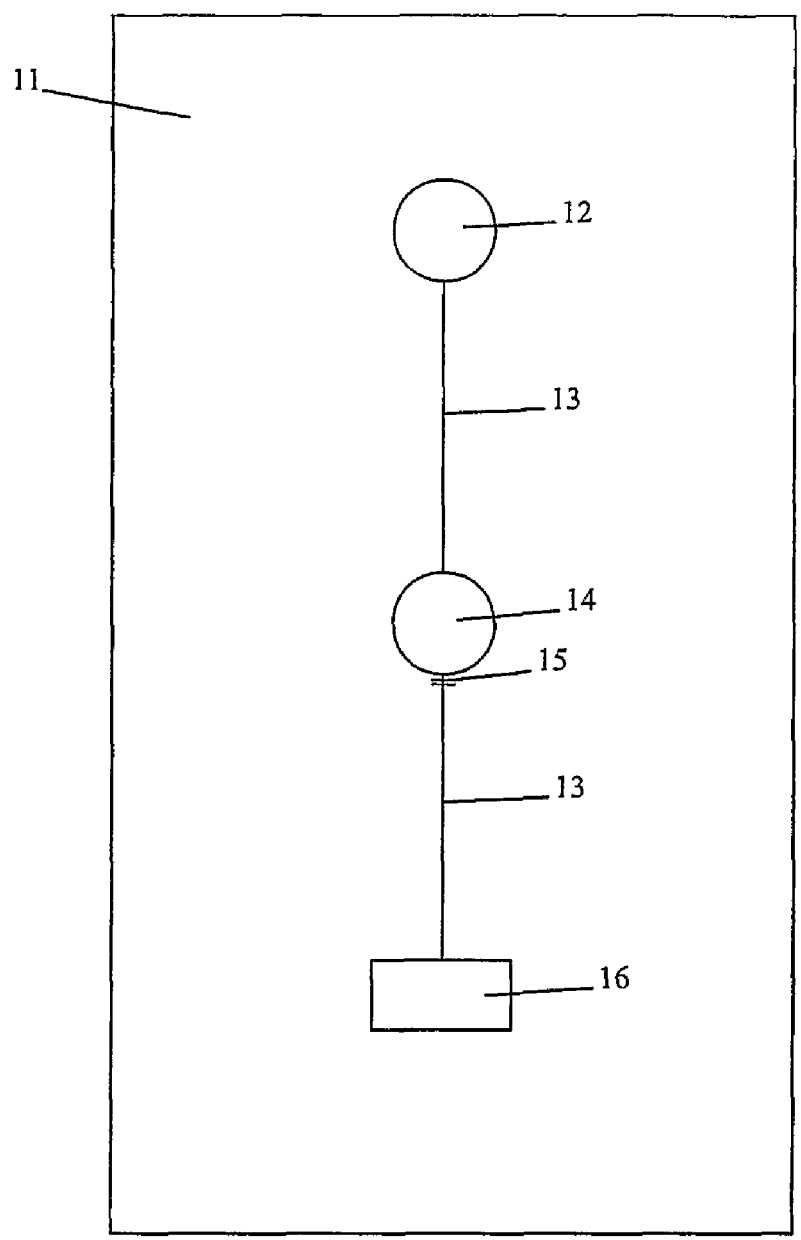
FIG. 2 depicts schematic view of an alternative device according to the invention.

FIG. 2 is a schematic illustration of another embodiment of the invention. The features of the device, such as the inlet region, channels and detection zone, are typically fabricated into or upon a substrate 11. The device comprises an inlet region 12 and a detection zone 16 which are connected by a channel 13. The channel 13 is interrupted by incubation chamber 14. The channel 13 also houses a fluid gate 15 which is positioned downstream of the incubation chamber 14. The positioning of the incubation chamber 14 and the fluid gate 15 in this manner allows the fluid sample to be retained in the incubation chamber 14 by ensuring that the temperature of the fluid gate 15 is below the UCST of the UCST polymer. The fluid can therefore be held in the incubation chamber 14 by keeping the fluid gate 15 closed, for example to allow sufficient time for reaction of the fluid with a reagent. Once it is desired to release the fluid from the incubation chamber 14, the temperature of the fluid gate 15 can be raised to above the UCST of the polymer and the gate will open.

In use, the fluid sample enters the device at the inlet zone 12 and then flows towards the detection zone 16 via the channel 13. Before reaching the detection zone 16, the fluid passes through firstly the incubation chamber 14 and then the fluid gate 15.

Figure 3:
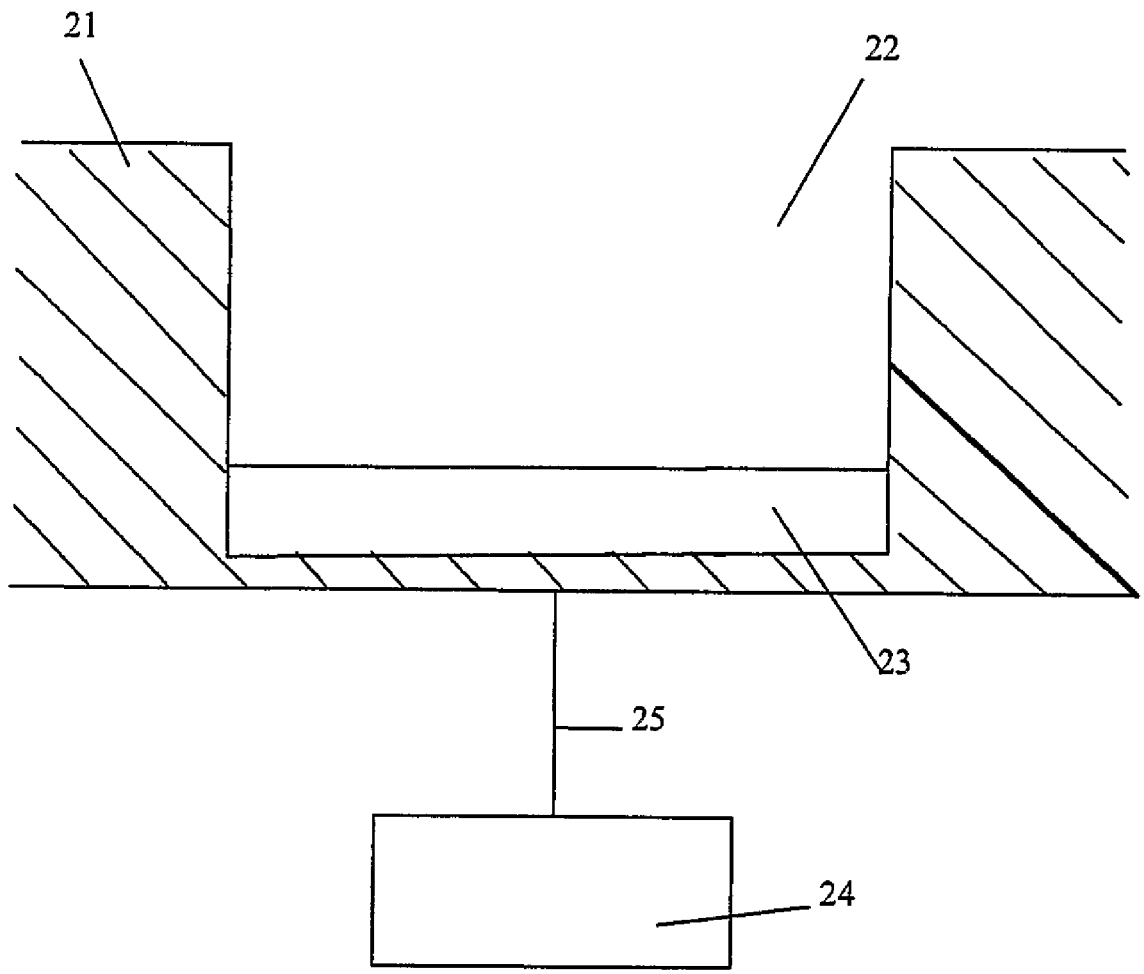
FIG. 3 depicts a cross-section of a microfluidic device taken parallel to the direction of a channel and through the fluid gate.

FIG. 3 shows a cross-section of a microfluidic device taken parallel to the direction of a channel and through the fluid gate. The body of the device 21 contains a channel 22. Within the channel 22 is a fluid gate 23 which comprises a UCST polymer. The temperature of the device is controlled using heater 24 which is in thermal contact with the fluid gate by means 25. In general, the working temperature of the device will be below the UCST of the polymer and the fluid gate 23 will be closed. However, the heater 24 can be used to raise the temperature of the fluid gate 23 above the USCT of the polymer and the fluid gate 23 will then open.

Figure 4A:
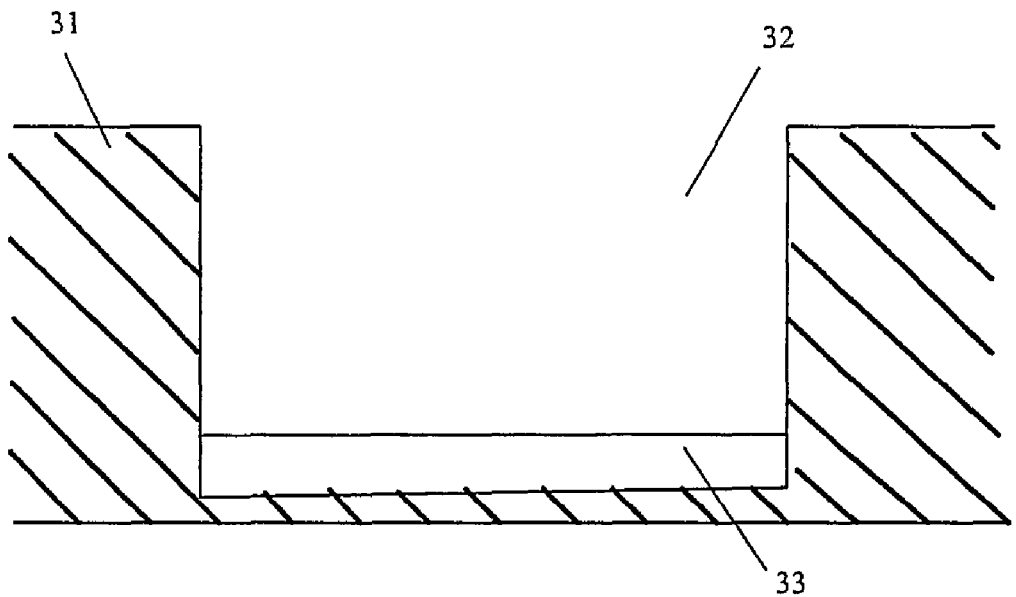
FIG. 4a depicts the device below the USCT whilst
Figure 4B:
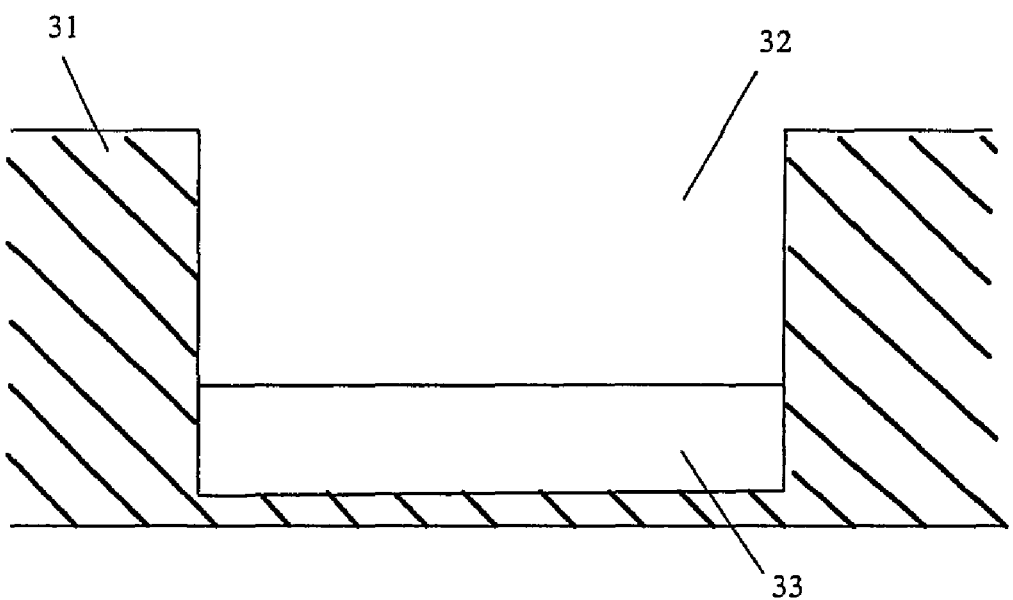
FIG. 4b depicts the device above the USCT.

FIG. 4 shows a cross-section of a microfluidic device taken parallel to the direction of a channel through the fluid gate. The body of the microfluidic device 31 houses a channel 32 which contains a fluid gate 43 that comprises a UCST polymer. FIG. 4a shows the fluid gate below the UCST, where the polymer is hydrophobic and the gate is closed. FIG. 4b shows the fluid gate above the UCST where the polymer is hydrophilic and the fluid gate is open. In accordance with this embodiment, the height of the fluid gate, even when in its hydrophilic form, is much less than the height of the channel. It is also to be noted that fluid flow is allowed when the conformation of the UCST polymer is such that the fluid gate is small. However, fluid flow is allowed when the conformation of the UCST polymer is such that the fluid gate is larger. This demonstrates that a fluid gate in accordance with this embodiment rely upon the hydrophobic/hydrophilic nature of the UCST rather than its volume.

The following Examples illustrate the invention.

EXAMPLES

Formation of the Polymer Brushes

Patterned gold samples were prepared by microcontact printing (μCP) of a thiol initiator (ω-mercaptoundecylbromobutyrate) onto clean gold substrates. For brushes grown on $Si/SiO_2$, 2-Bromo-2-methyl-propionic acid 3-trichlorosilanyl-propyl ester was used to prepare the initiator-modified substrates. The polymerization solution was prepared as follows: commercially-available MEDSAH (30 g, 107 mmol) was dissolved in water (20 cm$^3$) and MeOH (80 cm$^3$) at 20° C. and degassed by passing a continuous stream of dry $N_2$ through the solution whilst being stirred (20 minutes). To this solution was added 2,2'-dipyridyl (840 mg, 5.37 mmol), $Cu^{I}Cl$ (212 mg, 2.15 mmol) and $Cu^{II}Cl_2$ (29 mg, 0.21 mmol). The mixture was then further stirred and degassed with a stream of dry $N_2$ (15 minutes). Initiator-modified samples (~1 cm$^2$ each) were sealed in Schlenk tubes, degassed (4×high-vacuum pump/$N_2$ refill cycles) and left at 20° C. under $N_2$. The polymerization solution was then syringed into each Schlenk tube, adding enough solution to submerge each sample completely. After various polymerization times the samples were removed, washed with warm water (~60° C.) and dried under a stream of $N_2$. Contact angle goniometry was performed using a homemade stage with a computer controlled microsyringe and digital camera. Infusion and withdrawal rates of 4 μL min$^{-1}$ were used. Advancing water contact angles ($\theta_{AW}$) were recorded. Surface elemental analyses with AES (INIFTA—La Plata) were carried out using a single-pass cylindrical mirror analyzer (CMA, Physical Electronics). All the spectra were recorded in the differential mode dN(E)/dE. Multi-point analysis across each sample was performed in order to obtain an average estimation of surface composition. AFM experiments were carried out in a liquid cell using a MacMode PicoSPM magnetically driven dynamic force microscope (Molecular Imaging). Images were taken using commercially available type II MAClevers with a nominal force constant of 2.8 N·m$^{-1}$ at a driving frequency of 19 Hz in the liquid environment.

Investigation into the Relationship Between Self-Association and Molecular Weight MEDSAH brushes of 5 nm≦h≦200 nm were synthesized and analyzed by measuring the dependence of the advancing water contact angle ($\theta_{AW}$) on h. It was found that thin brushes, h<50 nm, display a very hydrophilic surface with a nearly constant $\theta_{AW}$~12°. Thicker brushes, with h up to 100 nm, show a most surprising and more or less linear increase in hydrophobicity with increases in brush thickness. Theses first and second regimes will be referred to as the "non-associated regime" and the "self-associated regime", respectively.

Investigation into the Trade-Off Between Hydration and Swelling Vs. Self-Association and Dehydration A 50-nm thick patterned PMEDSAH brush in air was studied under water using tapping-mode atomic force microscopy (AFM). When imaged under water, the brushes swelled significantly to h~150 nm. This swelling of the brush in water is in accordance with the hydrophilic characteristics previously observed by contact angle goniometry of the homogeneous PMEDSAH-modified substrates. In contrast, thicker PMEDSAH brushes, h=90 nm in air, were found essentially not to swell when imaged under water, h=96 nm. While PMEDSAH brushes in the hydrophilic, non-associated regime experienced a 200% increase in h when placed in water, the corresponding brushes in the hydrophobic, self-associated regime only experienced a 7% increase under similar conditions.

Investigating the Change in Wettability Upon Increasing the Brush Thickness

Such changes reflect the presence of a reorganization processes within the macromolecular film and were observed by elemental analysis of the outermost layers of the PMEDSAH brushes using Auger electron spectroscopy (AES). AES is a surface chemical analysis technique capable of detecting elements at concentrations above 0.2-1 at. % in the outer region (~2 nm) of the surface layer. The elemental compositions of S (due to the $SO_3^-$ moieties), N (due to the quaternary ammonium moieties) and O that is an element present all over the polymer backbone were monitored. AES characterization for PMEDSAH films with different thicknesses (19 nm, 30 nm, 65 nm, 192 nm and 195 nm) revealed a quite sensitive decrease in S composition when increasing the film thickness, as determined by the decrease in the Auger signal ratio between S and O ($I_S/I_O$). However, the N composition remained nearly constant for the polymer films of varied thickness ($I_N/I_O$~0.4). This fact implies that the reorganization process could lead to a new conformation where the $SO_3^-$ moieties (hydrophilic character) could be preferentially buried in the macromolecular film.

Investigation into the Hydrophobic-to-Hydrophilic Transition of the Polymer Brush The contact angles of 180 nm thick, hydrophobic PMEDSAH brushes at room temperature and at 52° C. were measured. It was found that the wetting properties changed from $\theta_{AW}$~79° to $\theta_{AW}$~58° when the temperature is increased from 22° to 52° C., thus supporting the predicted thermoresponsive behavior of PMEDSAH brushes. Repeated temperature cycling showed that this behavior was completely reversible. Similar experiments were also performed after a few months and showed identical results. This therefore provides evidence for the stability of the film and its thermoresponsive characteristics.

The invention claimed is:

1. A method of controlling the flow of an aqueous fluid in a microfluidic device, which method comprises the steps of:

(a) adding a fluid sample to a microfluidic device, which comprises an inlet region and a downstream detection zone which are connected by one or more channels, wherein at least one channel contains a fluid gate comprising a UCST (upper critical solubility temperature) polymer, wherein said UCST polymer is derived from the polymerization of a MEDSAH ([2-(methacryloyloxy)ethyl]-dimethyl-(3-sulfopropyl)ammonium hydroxide) monomer;

(b) allowing the sample to be retained within the device for a period of time by the fluid gate by maintaining the temperature of the fluid gate below the USCT of the polymer such that the fluid gate is closed, followed by (c) applying heat to raise the temperature of the fluid gate above the USCT of the polymer such that the fluid gate opens and the fluid sample is able to flow across the fluid gate to a region downstream from said gate, wherein the cross-sectional area of the polymer is 50% or less of the channel cross-sectional area.

2. A method according to claim 1 wherein the fluid gate is provided upstream or downstream of the detection zone.

3. A method according to claim 1 which further comprises the step of detecting an analyte in the fluid sample.

4. A method according to claim 1 wherein the fluid sample is a liquid sample.

5. A method according to claim 1 wherein the UCST polymer is in the form of a polymer brush.

6. A method according to claim 5 wherein the polymer brush has a thickness of greater than 50 nm.

7. A method according to claim 1 wherein the UCST polymer is a zwitterionic polymer.

8. A method according to claim 1 wherein the UCST polymer comprises sulphobetaine polymers.

9. A method according to claim 1 wherein the cross-sectional area of the polymer is 25% or less of the channel cross-sectional area.

* * * * *